United States Patent [19]

Berg

[11] 3,973,799
[45] Aug. 10, 1976

[54] SWIVELING AND FOLDING BENCH SEAT
[75] Inventor: Alan D. Berg, Rochester, Mich.
[73] Assignee: General Motors Corporation, Detroit, Mich.
[22] Filed: Sept. 18, 1975
[21] Appl. No.: 614,480

[52] U.S. Cl. ............................. 297/341; 296/65 R; 297/349; 297/379
[51] Int. Cl.² ........................ A47C 1/02; B60N 1/02
[58] Field of Search .......... 297/341, 379, 378, 349, 297/240, 356, 328; 296/65 R, 69, 64, 63; 248/393, 425, 429

[56] References Cited
UNITED STATES PATENTS

| | | | |
|---|---|---|---|
| 2,559,548 | 7/1951 | Seigneur | 296/63 |
| 3,013,837 | 12/1961 | Pessl et al. | 296/65 R |
| 3,066,979 | 12/1962 | Pitts et al. | 297/240 |
| 3,338,622 | 8/1967 | Bachmann | 297/349 X |
| 3,550,949 | 12/1970 | Bonnaud | 296/69 |
| 3,853,373 | 12/1974 | Corbett | 297/341 |
| 3,880,464 | 4/1975 | Murphy et al. | 297/379 |

Primary Examiner—James T. McCall
Attorney, Agent, or Firm—C. E. Leahy

[57] ABSTRACT

The seat cushion of a bench type vehicle seat has a first end pivotally mounted on the vehicle body and a second end mounted by a track assembly permitting fore and aft sliding movement of the second end so that the entire seat swivels about the first end. A link is located adjacent the second end of the seat cushion and has a lower end pivoted to the vehicle floor. A seat back has one end pivotally connected to the first end of the seat cushion and another end pivotally connected to the link. The link has a cam slot in which a cam roller mounted on the seat cushion is slidably engaged so that pivotal movement of the link effects fore and aft sliding movement of the second end of the seat cushion. A first latch is provided between the link and the seat. A second latch is provided between the seat back and the vehicle body. When the second latch is released the seat back and link are permitted to pivot forwardly which in turn induces forward swiveling movement of the seat cushion to facilitate access behind the seat. A lost motion connecting linkage is provided between the first and second latches so that unlatching of the first latch effects simultaneous unlatching of the second latch to permit pivotal movement of the seat back relative the seat cushion and the link to thereby move the seat back to a cargo floor forming position overlying the seat cushion.

3 Claims, 7 Drawing Figures

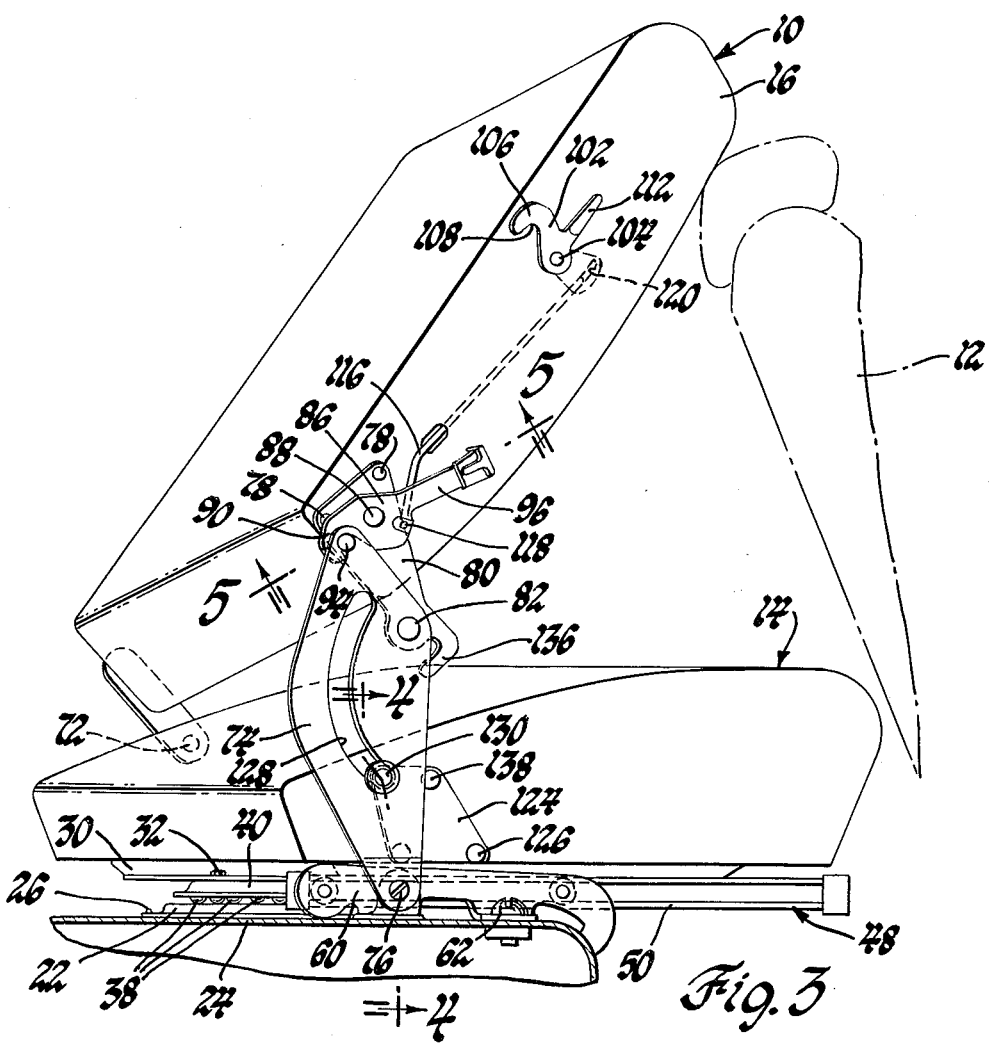

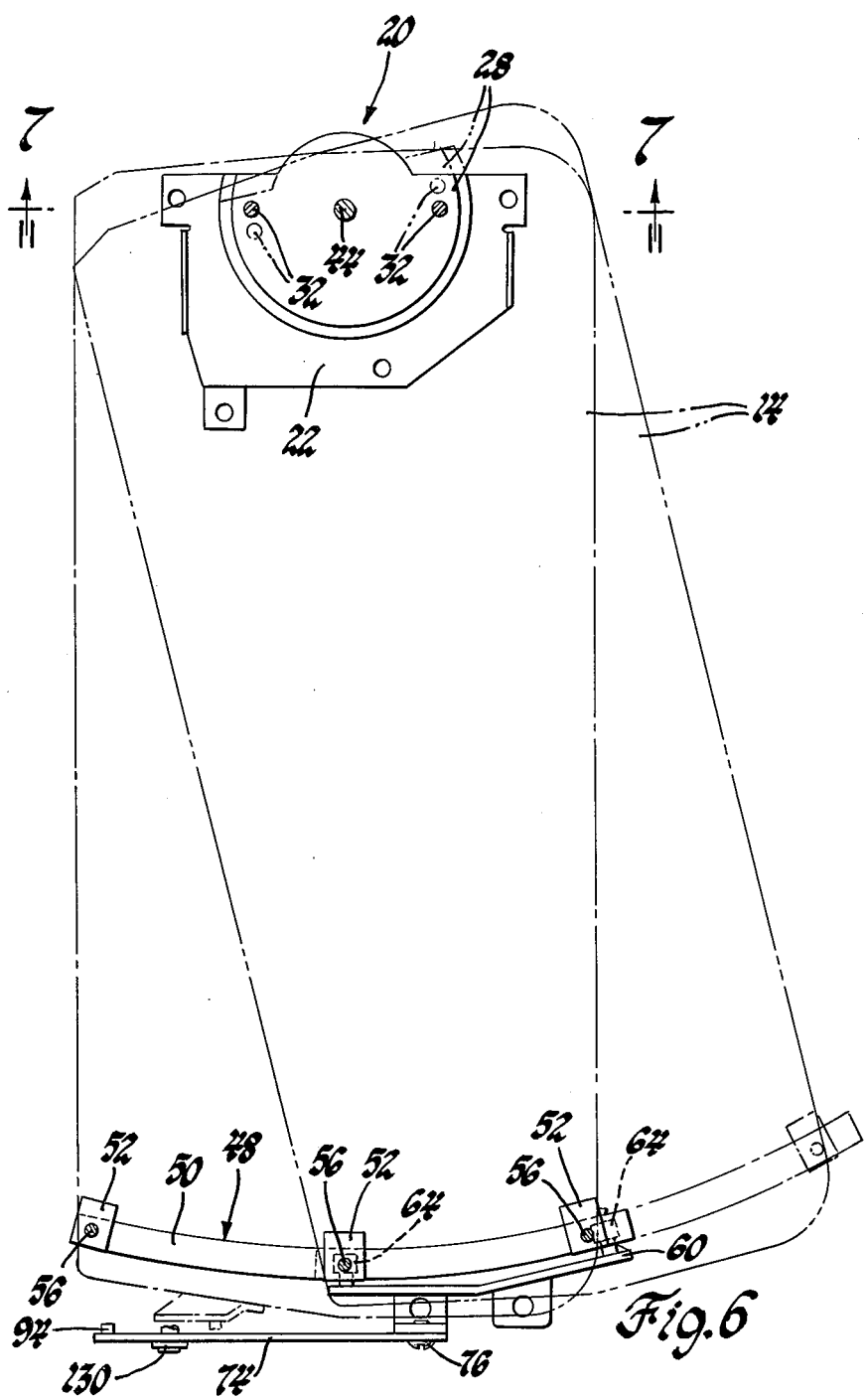
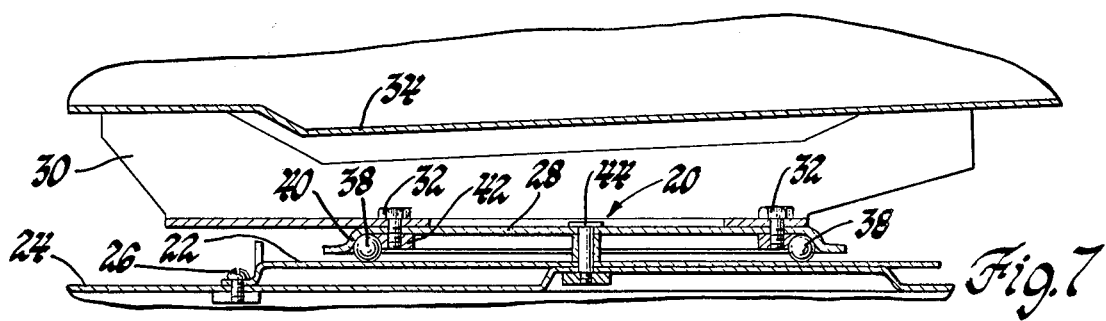

SWIVELING AND FOLDING BENCH SEAT

The invention relates to a vehicle seat in which forward folding movement of the seat back selectively provides a cargo floor or induces forward sliding movement of the vehicle seat cushion to facilitate access to the area behind the vehicle seat.

It is known to provide a bench-type vehicle seat having a first end pivotally mounted on the vehicle and a second end mounted for fore and aft sliding movement by a curvilinear track so that the seat swivels forwardly to facilitate access behind the vehicle seat.

It is also known to provide a vehicle seat wherein forward tilting movement of a pivoted seat back induces bodily forward sliding movement of the seat.

It is also known to provide a seat back pivoted to a seat cushion so that the seat back may be folded downwardly to overlie the seat cushion and provide a cargo floor.

According to the present invention, the seat cushion of a bench-type seat for a motor vehicle has a first end pivotally mounted on the vehicle body. The second end of the seat cushion is mounted on the vehicle body by a track assembly which permits fore and aft sliding movement of the second end of the seat cushion. The track assembly is curved at a fixed radius from the pivotal mount of the first end of the seat cushion so as to accommodate pivoting of the seat cushion about the first end. A pivotal connection is provided between the first end of the seat cushion and the associated end of a seat back. A link located adjacent the second end of the seat cushion has a lower end pivoted to the vehicle floor and an upper end pivoted to the seat back. The link has a cam slot in which a cam roller is slidably engaged. The cam roller is mounted on the seat cushion so that pivotal movement of the link about the pivot at its lower end effects fore and aft sliding movement of the seat cushion. A first latch is provided between the upper end of the link and the seat back. A second latch is provided between the seat back and the vehicle body. When the second latch is released by a handle provided thereon, the seat back is released from the vehicle body permitting forward pivoting movement of the seat back and the link to induce forward swiveling movement of the seat cushion to facilitate access behind the seat. Subsequent rearward pivoting movement of the seat back and link returns the seat cushion to its normal rearward seat forming position. Simultaneous unlatching of the first and second latches permits pivotal movement of the seat back relative the link so that the seat back may be folded forwardly to a cargo floor forming position overlying the seat cushion. A lost motion connecting linkage is provided between the first and second latches so that unlatching of the second latch by its handle does not effect unlatching of the first latch. However, unlatching of the first latch does effect simultaneous unlatching of the second latch to facilitate movement of the seat back to the cargo floor forming position.

IN THE DRAWINGS

FIG. 3 is a view similar to FIG. 1 but showing the seat back tilted forwardly and the seat cushion swiveled forwardly to easy-enter position providing improved access behind the vehicle seat;

FIG. 4 is a sectional view taken in the direction of arrows 4—4 of FIG. 3;

FIG. 5 is a sectional view taken in the direction of arrows 5—5 of FIG. 3;

FIG. 6 is a plan view in phantom line showing the seat cushion in its respective seat forming and easy-enter positions; and FIG. 7 is a sectional view taken in the direction of arrows 7—7 of FIG. 6.

Figure 1:
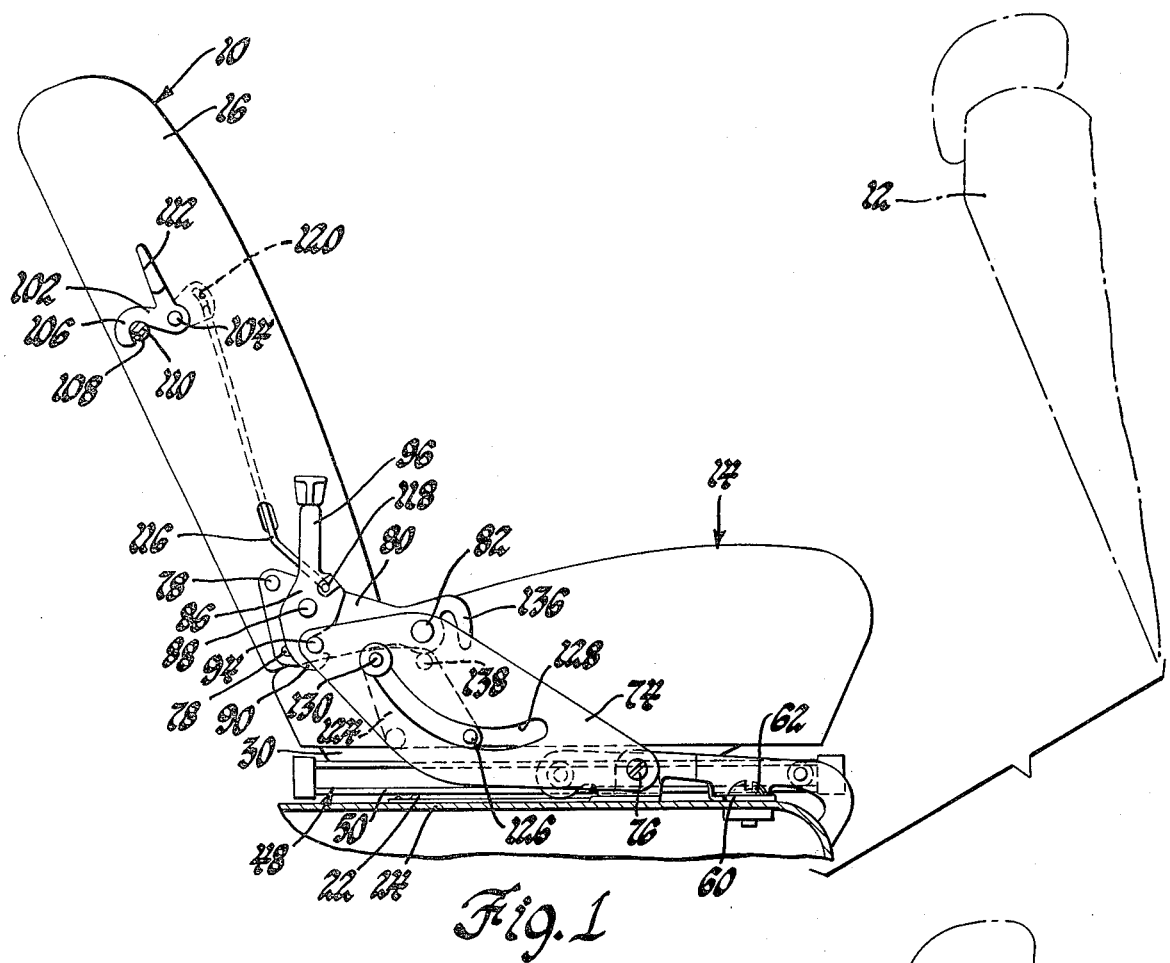
FIG. 1 is a side elevation view of a vehicle seat according to the invention and shown in normal seat forming position.

Referring to FIG. 1, a vehicle seat 10 is preferably the second seat of a station wagon type vehicle and is located just rearwardly of a front vehicle seat 12. The vehicle seat 10 includes a seat cushion 14 and a seat back 16.

Referring to FIGS. 6 and 7, it will be seen that the end of the vehicle seat on the driver's side is mounted on the vehicle body by a swivel mechanism indicated generally at 20. Swivel mechanism 20 includes a lower swivel plate 22 which is attached to the vehicle floor pan 24 by a plurality of screws 26 and an upper swivel plate 28 which is attached to a seat bottom bracket 30 by bolts 32. The seat bottom bracket 30 is in turn conventionally attached to the seat cushion frame 34. A plurality of balls 38 are retained in position between the lower swivel plate 22 and the upper swivel plate 28 by a flange structure 40 of the upper swivel plate 28 and a retaining ring 42 attached to the upper swivel plate 28 by the bolts 32. A pivot bolt 44 connects the center of the upper swivel plate 28 with the lower swivel plate 22 and the floor pan 24. Thus, it is seen that the swivel mechanism 20 pivotally mounts the end of the seat cushion at the driver's side to the vehicle floor.

Referring to FIGS. 1 and 4, it will be seen that the other end of the vehicle seat, at the passenger's side of the vehicle, is mounted to the vehicle body by a track assembly indicated generally at 48. A C-shaped track 50 is attached as by welding to a bracket 52 which is in turn attached to a seat cushion frame member 54 by a bolt 56. As best seen in FIG. 6, the track 50 is arcuately curved about the pivot bolt 44 at the driver's end of the seat. A mounting bracket 60 is attached to the vehicle floor pan 24 by a bolt and nut assembly 62. A roller 64 is engaged within the track 50 and is mounted on the mounting bracket 60 by a roller shaft 66. As seen in FIG. 6, rollers 64 are provided at at least two spaced points so as to adequately support the seat under the weight of the occupant.

As best seen in FIG. 3, the seat back 16 is connected to the first end of seat cushion 14 by a pivot pin 72. The pivot pin acts between conventional bracketry, not shown, which is provided on both the frame of the seat back and the frame of the seat cushion. The second end of the vehicle seat 10 at the passenger's side of the vehicle has a link 74 which connects the seat back 16 with the vehicle body. As best seen in FIG. 4, the lower end of the link 74 is connected to the mounting bracket 60 by a pivot bolt 76. A seat back plate 80 is attached to the seat back 16 as by rivets 78. A pivot pin 82 connects the forward end of the seat back plate 80 with the upper end of the link 74 so that the seat back 16 may pivot about pivot pin 82 relative the link 74.

Figure 2:
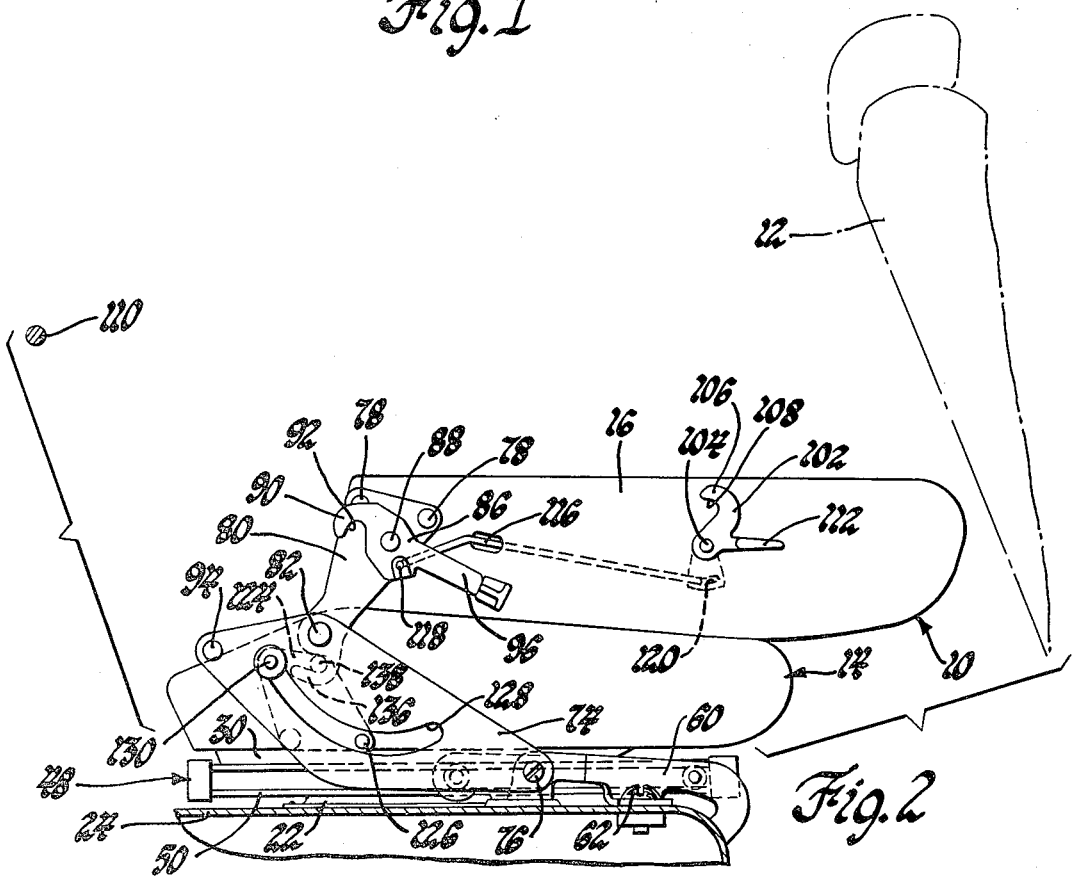
FIG. 2 is a view similar to FIG. 1 but showing the seat back folded forwardly into cargo floor forming position.

A first latch mechanism is provided which acts between the link 74 and the seat back 16 to selectively prevent and permit pivotal movement of the seat back 16 relative the link 74. A latch lever 86 is mounted on the seat back plate 80 by a pivot 88. As best seen in FIG. 2, the latch lever 86 has a hook portion 90 defining a recess 92 which is engageable over a pin 94 which projects from the link 74 as best seen in FIG. 5. As best seen in FIGS. 1 and 3, the hook portion 90 of the lever 86 is normally engaged over the pin 94 to prevent pivotal movement of the seat back 16 about the pivot pin 82. As seen in FIG. 2, pivotal movement of the lever 86 about the pivot 88 to disengage the hook portion 90 from the pin 94 permits forward tilting movement of the seat back about the pivots 72 and 82 to a cargo floor position as shown in FIG. 2.

A second latch mechanism is provided between the seat back 16 and the vehicle body to normally prevent forward tilting movement of the seat back 16. As best seen in FIG. 1, a lever 102 is mounted on the seat back 16 by a pivot 104 and has a hook portion 106 defining a recess 108 which is engageable over a pin 110 mounted on a rigid structure of the vehicle body. The latch lever 102 also has an operating handle 112 by which the latch lever 102 can be pivoted in a clockwise direction about pivot 104 to release the seat back 16 from engagement with the vehicle body pin 110 so as to permit forward tilting movement of the seat back 16.

A lost-motion connecting linkage is provided which acts between the latch lever 86 and the latch lever 102. The connecting linkage includes a connecting rod 116 which is connected to the latch lever 86 by a pivot 118 and rides in a slot 120 provided in the latch lever 102. As seen in FIG. 1, the slot 120 provides a lost motion connection such that the latch lever 102 may be moved to unlatched position by manipulation of handle 112 without moving the lever 86 to unlatched position. On the other hand, movement of the latch lever 86 to its unlatched position by handle 96 will effect pivotal movement of the latch lever 102 to its unlatched position.

A seat cushion plate 124 is conventionally attached to the second end of seat cushion 14 as by rivets 126. A cam slot 128 is provided in the link 74. A cam roller 130 is mounted on the seat cushion plate 124 by a pivot shaft 132. The cam roller 130 rides in the cam slot 128 to effect forward movement of the seat cushion 14 when the seat back 16 and link 74 are tilted forwardly as seen in FIG. 3.

OPERATION

Referring to FIG. 1, the vehicle seat is shown in its normal seat forming position wherein the seat back 16 is latched to the vehicle body by latch lever 102.

The seat back may be tilted forwardly to a cargo floor position of FIG. 2 by operating the handle 96 to pivot latch lever 86 about its pivot 88 to disengage the latch lever 86 from the pin 94 of the link 74 and simultaneously pivot latch lever 102 out of engagement with body mounted pin 110.

When the seat back 16 is in its cargo floor position of FIG. 2, a hook portion 136 of the seat back plate 76 engages a stop pin 138 projecting from the seat cushion plate 124 so as to support the seat back 16 against further forward pivoting movement about the pivot pin 82.

Referring again to FIG. 1, if it is desired to swivel the vehicle cushion forwardly to facilitate access to a storage area or third seat located behind the vehicle seat 10, the handle 112 is operated to disengage the latch lever 102 from the body mounted pin 110. The seat back is then tilted forwardly as seen in FIG. 3. Since the seat back 16 is latched to the link 74 by the latch lever 86, the seat back 16 and the link 74 are pivoted bodily about the pivot bolt 76. As the link 74 is pivoted about the pivot bolt 76, the seat cushion mounted cam roller 130 rides in the cam slot 128 to effect forward sliding movement of the passenger's end of the seat as seen in FIGS. 3 and 6. The cam slot 128 is curved and inclined as shown in FIG. 1, so as to provide the desired extent and rate of forward sliding movement of the seat cushion as the seat back 16 is tilted forwardly.

What is claimed is:

1. A seat for a motor vehicle comprising: a seat cushion, means pivotally mounting a first end of the seat cushion on the motor vehicle, track means mounting a second end of the seat cushion on the motor vehicle to permit fore and aft sliding movement of the second end of the seat cushion between a normal rearward position and a forward position facilitating access behind the seat cushion, a seat back, a link located adjacent the second end of the seat cushion, pivot means connecting one end of the link to the vehicle body, seat back pivot means pivotally connecting a first end of the seat back to the first end of the seat cushion and pivotally connecting a second end of the seat back to the other end of the link to permit the seat back to be folded downwardly to a cargo floor forming position overlying the seat cushion, latch means acting between the link and the seat back to prevent pivotal movement of the seat back relative the link when the latch means is engaged to thereby prevent forward folding movement of the seat back to the cargo floor forming position, and means acting between the seat cushion and the link whereby when the latch means is latched, and forward pivoting movement of the seat back pivots the link, the seat cushion is moved forwardly to the forward position as permitted by pivoting of the one end of the seat by the associated pivot means and by the sliding movement of the track means.

2. A seat for a motor vehicle comprising: a seat cushion, means pivotally mounting one end of the seat cushion on the motor vehicle; track means mounting the other end of the seat cushion on the motor vehicle and permitting fore and aft sliding movement of the seat cushion between a normal rearward position and a forward position facilitating access behind the seat cushion; a seat back; means pivotally connecting one end of the seat back to the seat cushion; a link located adjacent the other end of the seat back and having a cam slot therein; first pivot means connecting one end of the link to the vehicle body and second pivot means connecting the other end of the link to the seat back; first latch means acting between the link and the seat back to prevent pivotal movement of the seat back about the second pivot means when the first latch means is latched; second latch means acting between the seat back and the vehicle body to retain the seat back in a normal upright seat forming position when latched; and cam follower means on the seat cushion slidably engaged in the cam slot of the link whereby when the second latch means is unlatched and the first latch means is latched, forward pivoting movement of the seat back pivots the link and the cam follower means rides in the cam slot to move the vehicle seat cushion forwardly to the forward position, simultaneous unlatching of the first and second latch means permitting the seat back to pivot relative the link so that the seat back is folded downwardly to cargo floor forming position overlying the seat cushion.

3. A seat for a motor vehicle comprising: a seat cushion, means pivotally mounting a first end of the seat cushion on the motor vehicle, track means mounting a second end of the seat cushion on the motor vehicle to permit fore and aft sliding movement of the second end of the seat cushion between a normal rearward position and a forward position facilitating access behind the seat cushion; a seat back; a link located adjacent the second end of the seat back and having a cam slot therein; pivot means connecting one end of the link to the vehicle body; seat back pivot means pivotally connecting a first end of the seat back to the first end of the seat cushion and pivotally connecting the second end of the seat back to the other end of the link to permit the seat back to be folded downwardly to a cargo floor forming position overlying the seat cushion; first latch means acting between the link and the seat back to prevent pivotal movement of the seat back relative the link when the first latch means is engaged to thereby prevent forward folding movement of the seat back to the cargo floor forming position; second latch means acting between the seat back and the vehicle body to retain the seat back in a normal upright seat forming position when latched; cam follower means mounted on the seat cushion slidably engaged in the cam slot of the link whereby when the second latch is unlatched and the first latch means is latched, forward pivoting movement of the seat back pivots the link so that the cam follower means rides in the cam slot to move the vehicle seat cushion forwardly to the forward position as permitted by pivoting of the one end of the seat by the associated pivot means and by the sliding movement of the track means; and lost-motion means interconnecting the first and second latch means so that the unlatching of the second latch means does not effect unlatching of the first latch means but unlatching of the first latch means automatically unlatches the second latch means so that the seat may be forwardly folded to the cargo floor forming position by manual unlatching of only the first latch means.

\* \* \* \* \*